United States Patent
Huang

(10) Patent No.: US 7,148,888 B2
(45) Date of Patent: Dec. 12, 2006

(54) HEAD/DATA REQUEST IN 3D GRAPHICS

(75) Inventor: Hsilin Huang, Milpitas, CA (US)

(73) Assignee: VIA Technologies, Inc. (TW)

( * ) Notice: Subject to any disclaimer, the term of this patent is extended or adjusted under 35 U.S.C. 154(b) by 298 days.

(21) Appl. No.: 10/407,448

(22) Filed: Apr. 4, 2003

(65) Prior Publication Data

US 2004/0196281 A1    Oct. 7, 2004

(51) Int. Cl.
*G06T 15/00* (2006.01)

(52) U.S. Cl. ............ 345/419; 345/506; 345/537; 345/538; 345/556; 345/586

(58) Field of Classification Search ............ 345/556, 345/538, 537, 506, 419, 586
See application file for complete search history.

(56) References Cited

U.S. PATENT DOCUMENTS 5,821,940 A    10/1998   Morgan et al.
6,597,363 B1 *  7/2003   Duluk et al. ............ 345/506
6,906,716 B1 *  6/2005   Moreton et al. ......... 345/423

FOREIGN PATENT DOCUMENTS

EP    0803798 A1    3/1997

* cited by examiner

*Primary Examiner*—Kimbinh T. Nguyen
(74) *Attorney, Agent, or Firm*—Anthony B. Diepenbrock, III; Dechert LLP

(57) ABSTRACT

A method for efficiently processing graphics data for graphics primitives, the graphics data including vertex coordinate information and vertex attribute data. Coordinate information, in the form of homogeneous coordinates, of the graphics primitive determines whether the graphics primitive is to be rendered. If the primitive is to be rendered, then attribute data associated with the location information is retrieved. However, if the data is not to be rendered, then the location information is discarded. By only retrieving parameters for a primitive that is rendered, performance is increased. In one embodiment, the attribute data is fetched before it is known whether or not the graphics primitive is to be rendered, and if not, the prefetch is aborted, and new location information is fetched.

16 Claims, 2 Drawing Sheets

HEAD/DATA REQUEST IN 3D GRAPHICS

CROSS-REFERENCE TO RELATED APPLICATIONS

This application is related to U.S. patent application Ser. No. 10/447,406, filed Apr. 3, 2003, entitled HEAD/DATA SCHEDULING IN 3D GRAPHICS, the contents of which are incorporated by reference into the present application.

FIELD OF THE INVENTION

The present invention generally relates to processing of 3D graphics primitives and more particularly to a system and method for managing a pipeline, in which the graphics primitives are processed, to improve performance.

DESCRIPTION OF THE RELATED ART

For 3D graphic applications, each vertex has coordinates (X, Y, Z, W), color attributes (specular, ARGB, Diffuse ARGB and fog), and texture parameters (U, V). Referring to Table 1, typical data for triangles is shown. Specifically, triangle 0 has vertex coordinates HT0 and vertex attributes DT0_d (diffuse color), DT0_s (specular color), DT0_f (fog color), DT0_t (texture). Triangles 1 and 2 have the same parameters that is HT1, DT1_d, DT1_s, DT1_f and DT1_t, for triangle 1 and HT2, DT2_d, DT2_s, DT2_f, DT2_t for triangle 2. As seen in Table 1, it takes thirty (30) cycles to process data in the pipeline for six triangles.

TABLE 1

| | Cycle | | | | | | | | | | | | | | |
|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 |
| Data | HT0 | DT0_d | DT0_s | DT0_f | DT0_t | HT1 | DT1_d | DT1_s | DT1_f | DT1_t | HT2 | DT2_d | DT2_s | DT2_f | DT2_t |
| | Cycle | | | | | | | | | | | | | | |
| | 16 | 17 | 18 | 19 | 20 | 21 | 22 | 23 | 24 | 25 | 26 | 27 | 28 | 29 | 30 |
| | HT3 | DT3_d | DT3_s | DT3_f | DT3_t | HT4 | DT4_d | DT4_s | DT4_f | DT4_t | HT5 | DT5_d | DT5_s | DT5_f | DT5_t |

Also evident from Table 1, when multiple triangles are rendered by a graphics processor, not only the homogeneous coordinates (X, Y, Z, W) but also the vertex attributes must be fetched. As the use of more textures and other parameters increases, increasing amounts of vertex attributes must be fetched. However, statistically, only about half of the triangles are ever rendered on the screen. The other half of the triangles are either rejected as being either outside of the scissors box or by culling. Therefore, there is no need and a waste of processing cycles to fetch the data of the rejected or culled triangles.

As such, there is a need for a method that reduces the amount of data entered into the pipeline.

BRIEF SUMMARY OF THE INVENTION

A method in accordance with and embodiment of the present invention is a method of processing graphics data for a stream of graphics primitives. The method includes the steps of (i) loading a pipeline with HEAD information for a predetermined number of graphics primitives, (ii) performing a test based on the HEAD information in the pipeline for a selected one of the graphics primitives to determine whether the selected graphics primitive is to be rendered, where the test has a latency of a given number of pipeline cycles, (iii) while performing the test, prefetching DATA information into the pipeline for the selected graphics primitive to avoid empty pipeline cycles during the latency of the test, and if, during the prefetching, the test determines that a graphics primitive is not to be rendered, aborting the DATA information prefetching for the selected graphics primitive, (iv) selecting another primitive, (v) performing a test based on the HEAD information in the pipeline for the selected other one of the graphics primitives to determine whether or not the selected other graphics primitive is to be rendered, where the test has a latency of a given number of pipeline cycles, and (vi) while performing the test and to avoid empty pipeline cycles during the latency of the test, (1) prefetching DATA information into the pipeline for the selected other graphics primitive, (2) interrupting the prefetching of DATA information into the pipeline for the selected other graphics primitive and prefetching HEAD information into the pipeline for one or more other graphics primitives, if the HEAD information is available, and (3) resuming the prefetching of DATA information into the pipeline for the selected other graphics primitive.

Another method in accordance with an embodiment of the present invention includes the steps of (i) loading a pipeline with HEAD information for a predetermined number of graphics primitives, (ii) selecting one of the graphics primitives for processing, (iii) performing a test based on the HEAD information in the pipeline for the selected one of the graphics primitives to determine whether or not the selected graphics primitive is to be rendered, where the test has a latency of a given number of pipeline cycles, (iv) while performing the test, prefetching DATA information into the pipeline for the selected graphics primitive to avoid empty pipeline cycles during the latency of the test, (v) if the test determines that the graphics primitive is to be rendered, continuing the fetching of DATA for the selected primitive, if any DATA for the selected primitive has not been prefetched, and processing the fetched DATA information for the selected primitive, and (vi) prior to loading the pipeline with HEAD information for a predetermined number of graphics primitives, (1) obtaining the predetermined number of indices from an index stream, (2) storing each index in a memory storage unit according to a thread flag associated with each memory storage unit that indicates the availability of the memory storage unit for storing an index, (3) decoding each index to derive a pointer to the HEAD information for the graphics primitive, and (4) making a request for the HEAD information for each primitive to be obtained using the pointer, wherein loading the pipeline with HEAD information for a predetermined number of graphics primitives occurs in response to the to the requests for the HEAD information.

Yet another method in accordance with the present invention includes the steps of (i) loading a pipeline with HEAD information for a predetermined number of graphics primitives, (ii) selecting one of the graphics primitives for processing, (iii) performing a test based on the HEAD information in the pipeline for the selected one of the graphics primitives to determine whether or not the selected graphics primitive is to be rendered, where the test has a latency of a given number of pipeline cycles, (iv) while performing the test, prefetching DATA information into the pipeline for the selected graphics primitive to avoid empty pipeline cycles during the latency of the test; (v) if the test determines that the graphics primitive is to be rendered, continuing the fetching of DATA for the selected primitive, if any DATA for the selected primitive has not been prefetched, and processing the fetched DATA information for the selected primitive, (vi) if the test determines that the graphics primitive is not to be rendered, aborting the prefetching of DATA information for the selected graphics primitive, (vii) selecting another graphics primitive for processing, (viii) performing a test based on the HEAD information in the pipeline for the selected other one of the graphics primitives to determine whether or not the selected other graphics primitive is to be rendered, where the test has a latency of a given number of pipeline cycles, and (ix) while performing the test and to avoid empty pipeline cycles during the latency of the test, prefetching DATA information into the pipeline for the selected other graphics primitive.

BRIEF DESCRIPTION OF THE DRAWINGS

These and other features, aspects and advantages of the present invention will become better understood with regard to the following description, appended claims, and accompanying drawings where:

DETAILED DESCRIPTION OF THE INVENTION

Figure 1:
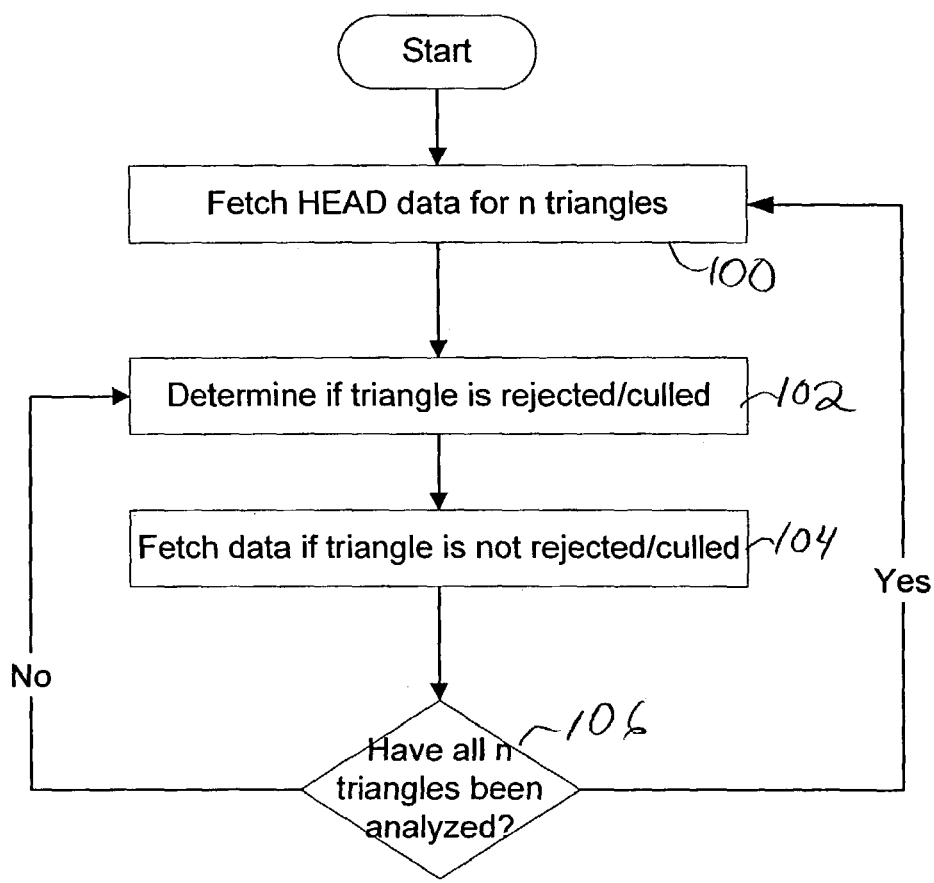
FIG. 1 is flowchart illustrating how data is fetched in accordance with the present invention.

Referring to the drawings wherein the showings are for purposes of illustrating a preferred embodiment of the present invention only, and not for purposes of limiting the same, FIG. 1 is a flowchart illustrating how data parameters for graphics primitives such as triangles not being processed can be rejected or culled prior to transfer on the data pipeline. Graphics primitives of the preferred embodiment of the present invention include triangles, but primitives may also include lines, anti-aliased lines, points, and point sprites. Specifically, in step 100, the HEAD data for n primitives are fetched. The HEAD includes the homogeneous coordinate data (i.e., X, Y, Z, W), but not the vertex attribute information for the graphics primitive. From the HEAD data, in step 102, it is possible to determine whether the triangle should be rejected or culled. Specifically, the coordinates X, Y, Z, W (HEAD data) enable the system to determine if the triangle should be rendered on the screen. If the triangle is not rendered, then it is rejected or culled. However, if the triangle is rendered, then, in step 104, the DATA information (attribute information for each of the vertices of the primitive) is fetched for processing. In step 106, it is determined whether all of the HEAD data for the n primitives has been analyzed. If not, then the process returns to step 102, where the next HEAD data is analyzed to determine whether the triangle should be rejected or culled. If the HEAD data for all n primitives has been analyzed, then the process returns to step 100 where more HEAD data is fetched.

Referring to Table 2, an example for the flowchart of FIG. 1 is shown. Specifically, in cycles 1 through 6, the HEAD data (HT0–HT5) is fetched first. As will be readily apparent, some processing cycles are required to determine whether the primitives should be rejected or culled. For the example in Table 2, it takes eight cycles to process the HEAD data HT0 to determine whether to process the triangle. This leaves cycles 7 through 9 unused.

For the example in Table 2, primitives (triangles) 0, 2, 4, 5, 8, and 10 are being culled and rejected. Accordingly, only the data for triangles 1, 3, 6, 7, 9 and 11 needs to be fetched. Therefore, beginning with cycle 10, the data (DT1_d, DT1_s, DT1_f, DT1_t) for triangle 1 is fetched. Next, starting with cycle 14, the data for triangle 3 is fetched. During cycles 18 through 23, the HEAD data for additional triangles is fetched, because triangles 4 and 5 are rejected. Therefore, by separating the HEAD and DATA information, and testing the HEAD information, only the data that needs to be processed is fetched, thereby reducing the number of total cycles needed to process the primitives.

TABLE 2

| | Cycle | | | | | | | | | | | | | |
|---|---|---|---|---|---|---|---|---|---|---|---|---|---|---|
| | 1 | 2 | 3 | 4 | 5 | 6 | 7 | 8 | 9 | 10 | 11 | 12 | 13 | 14 |
| Data | HT0 | HT1 | HT2 | HT3 | HT4 | HT5 | Empty | Empty | Empty | DT1_d | DT1_s | DT1_f | DT1_t | DT3_d |

| | Cycle | | | | | | | | | | | | | |
|---|---|---|---|---|---|---|---|---|---|---|---|---|---|---|
| | 15 | 16 | 17 | 18 | 19 | 20 | 21 | 22 | 23 | 24 | 25 | 26 | 27 | 28 |
| Data | DT3_s | DT3_f | DT3_t | HT6 | HT7 | HT8 | HT9 | HT10 | HT11 | Empty | Empty | Empty | DT6_d | DT6_s |

| | Cycle | | | | | | | | | | | | | |
|---|---|---|---|---|---|---|---|---|---|---|---|---|---|---|
| | 29 | 30 | 31 | 32 | 33 | 34 | 35 | 36 | 37 | 38 | 39 | 40 | 41 | 42 |
| Data | DT6_f | DT6_t | DT7_d | DT7_s | DT7_f | DT7_t | DT9_d | DT9_s | DT9_f | DT9_t | DT11_d | DT11_s | DT11_f | DT11_t |

Table 3 illustrates prefetching data to fill the empty cycles. Table 3 alters the example in Table 1 by using cycles 7, 8, and 9 to fetch the data for the first triangle before it is known whether the triangle should be rejected or culled. The DATA for triangle 0 is fetched in cycles 7, 8, and 9 before it is known whether triangle 0 should be rejected or culled. If triangle 0 is rejected or culled, then the DATA is discarded. If triangle 0 is not rejected or culled, then the remaining data is retrieved in the remaining cycles (i.e., the remaining attribute information for triangle 1 is retrieved in cycle 10). Therefore, it is possible to improve performance by using otherwise empty cycles for prefetching triangle data.

thread register flag 208 tracks which vertex cache decoder/request units are available to receive new indexes and whether the data calculation block is finished processing the retrieved data.

The scheduling/arbitration block 202 gives priority to HEAD information over DATA information. Therefore, if the data processing in data calculation block 204 has rejected the coordinate information for a certain graphics primitive such as a triangle, then the scheduling/arbitration block 202 gives priority to loading new HEAD information. Thus, it is possible with the thread selector 200 to efficiently choose either HEAD or DATA information when needed in order to save processing cycles.

An example of processing DATA and HEAD information with the dynamic thread selector 200 is shown. This example is similar to Tables 2 and 3 where triangles 0, 2, 4, 5, 8, and 10 are to be rejected or culled. As seen in Table 4, because the HEAD information has higher priority over the DATA information, the HEAD data is loaded in an earlier cycle, thereby saving processing cycles. This is shown in cycle 11 where the HEAD information for triangle 6 is loaded before all the DATA information for triangle 1 is completed. The dynamic thread selector 200 loads HEAD information in an efficient manner taking into account the latency of the rejection/culling calculation. Where the latency in the rejection/culling calculation is large (i.e., around 24 cycles), the savings in processing cycles can be large.

TABLE 3

| | | | | | | Cycle | | | | | | |
|---|---|---|---|---|---|---|---|---|---|---|---|---|
| 1 | 2 | 3 | 4 | 5 | 6 | 7 | 8 | 9 | 10 | 11 | 12 | 13 |
| Data | | | | | | | | | | | | |
| HT0 | HT1 | HT2 | HT3 | HT4 | HT5 | DT0_d Rejected | DT0_s Rejected | DT0_f Rejected | DT1_d | DT1_s | DT1_f | DT1_t |

| | | | | | | Cycle | | | | | | |
|---|---|---|---|---|---|---|---|---|---|---|---|---|
| 14 | 15 | 16 | 17 | 18 | 19 | 20 | 21 | 22 | 23 | 24 | 25 | 26 |
| Data | | | | | | | | | | | | |
| DT3_d | DT3_s | DT3_f | DT3_t | HT6 | HT7 | HT8 | HT9 | HT10 | HT11 | DT6_d | DT6_s | DT6_f |

| | | | | | | Cycle | | | | | | |
|---|---|---|---|---|---|---|---|---|---|---|---|---|
| 27 | 28 | 29 | 30 | 31 | 32 | 33 | 34 | 35 | 36 | 37 | 38 | 39 |
| Data | | | | | | | | | | | | |
| DT6_t | DT7_d | DT7_s | DT7_f | DT7_t | DT9_d | DT9_s | DT9_f | DT9_t | DT11_d | DT11_s | DT11_f | DT11_t |

Figure 2:
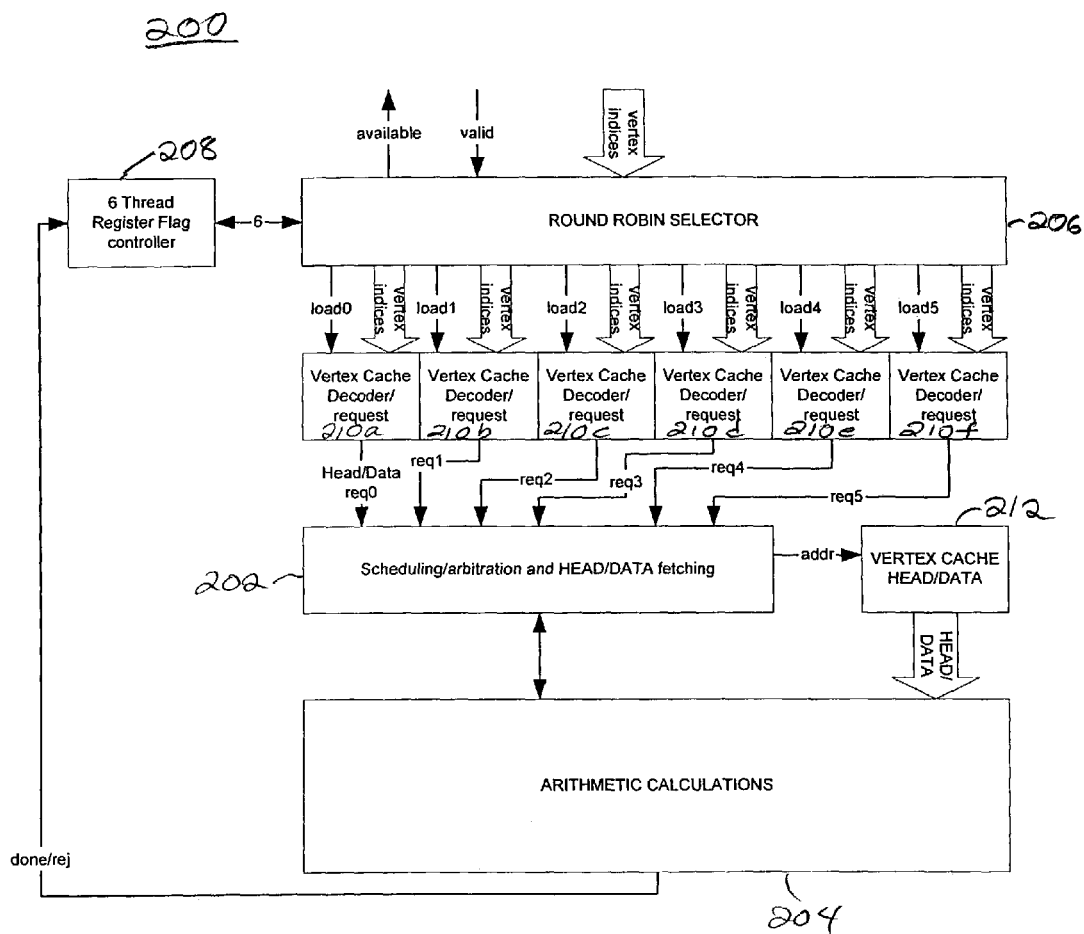
FIG. 2 is a block diagram of a system to fetch data in accordance with the present invention.

In addition to the foregoing, it is also possible to dynamically determine whether the triangle should be rejected or culled in order to improve efficiency. Specifically, referring to FIG. 2, a dynamic thread selector 200 efficiently processes the DATA and HEAD information in order to reduce processing cycles. Initially, index information for a graphics primitive is stored in vertex cache decoder/request units 0 through 5, 210a–f. A scheduling/arbitration and HEAD/DATA fetching block 202 retrieves the graphics primitive index from one of the vertex cache decoder/request units 210a–f. Once the index has been retrieved, a pointer to the coordinate information for the vertices of the primitive is formed by the decoder/request unit. A data calculation block 204 performs the necessary operations on the vertex coordinate data (accessed from the vertex cache 212 using the pointer) to determine whether the primitive should be rejected or culled. Furthermore, once the data has been retrieved, a round robin selector 206 can write new data into the now empty vertex cache decoder/request unit. A six (6)

TABLE 4

| | | | | | | Cycle | | | | | | | | |
|---|---|---|---|---|---|---|---|---|---|---|---|---|---|---|
| 1 | 2 | 3 | 4 | 5 | 6 | 7 | 8 | 9 | 10 | 11 | 12 | 13 | 14 | 15 |
| Data | | | | | | | | | | | | | | |
| HT0 | HT1 | HT2 | HT3 | HT4 | HT5 | DT0_d Rejected | DT0_s Rejected | DT0_f Rejected | DT1_d | HT6 | DT1_s | HT7 | DT1_f | HT8 |

| | | | | | | Cycle | | | | | | | | |
|---|---|---|---|---|---|---|---|---|---|---|---|---|---|---|
| 16 | 17 | 18 | 19 | 20 | 21 | 22 | 23 | 24 | 25 | 26 | 27 | 28 | 29 | 30 |
| Data | | | | | | | | | | | | | | |
| HT9 | DT1_t | HT10 | DT3_d | DT3_s | DT3_f | DT3_t | HT11 | DT6_d | HT12 | DT6_s | DT6_f | HT130 | DT6_t | HT14 |

It will be recognized by those of ordinary skill in the art that by determining whether the primitive should be culled or rejected before fetching the DATA information, the processing of coordinate information of a primitive is ahead of the processing of the attribute information of a primitive. Accordingly, it is necessary to separately maintain a record of the order of the coordinate information from the order of the attribute information. A method and apparatus maintaining a record of the ordering of such information is described in applicant's copending U.S. patent application Ser. No. 10/447,406 filed Apr. 3, 2003, entitled HEAD/DATA SCHEDULING IN 3D Graphics, the contents of which are incorporated herein by reference.

Although the present invention has been described in considerable detail with reference to certain preferred versions thereof, other versions are possible. Therefore, the spirit and scope of the appended claims should not be limited to the description of the preferred versions contained herein.

What is claimed is:

1. A method of processing graphics data for a stream of graphics primitives, comprising:
    loading a pipeline with HEAD information for a predetermined number of graphics primitives;
    performing a test based on the HEAD information in the pipeline for a selected one of the graphics primitives to determine whether the selected graphics primitive is to be rendered, the test having a latency of a given number of pipeline cycles;
    while performing the test, prefetching DATA information into the pipeline for the selected graphics primitive to avoid empty pipeline cycles during the latency of the test;
    if, during the prefetching, the test determines that a graphics primitive is not to be rendered, aborting the DATA information prefetching for the selected graphics primitive;
    selecting another primitive;
    performing a test based on the HEAD information in the pipeline for the selected other one of the graphics primitives to determine whether or not the selected other graphics primitive is to be rendered, the test having a latency of a given number of pipeline cycles; and
    while performing the test and to avoid empty pipeline cycles during the latency of the test, prefetching DATA information into the pipeline for the selected other graphics primitive, interrupting the prefetching of DATA information into the pipeline for the selected other graphics primitive and prefetching HEAD information into the pipeline for one or more other graphics primitives, if the HEAD information is available, and resuming the prefetching of DATA information into the pipeline for the selected other graphics primitive.

2. A method as recited in claim 1,
    wherein the HEAD information includes homogenous coordinates of the vertices of the graphics primitive; and
    wherein the DATA information includes vertex attribute data.

3. A method as recited in claim 2, wherein the vertex attribute data includes texture data.

4. A method as recited in claim 2, wherein the vertex attribute data includes color data.

5. A method as recited in claim 1, wherein the test determines, based on the HEAD information, whether the graphics primitive is outside the boundaries of a screen space.

6. A method as recited in claim 1, wherein the test determines, based on the HEAD information, whether the graphics primitive is not visible in a screen space.

7. A method as recited in claim 1, wherein the graphics primitive is a triangle.

8. A method as recited in claim 1, wherein the graphics primitive is a line.

9. A method as recited in claim 1, wherein the graphics primitive is an anti-aliased line.

10. A method as recited in claim 1, wherein the graphics primitive is a point.

11. A method as recited in claim 1, wherein the graphics primitive is a point sprite.

12. A method of processing graphics data as recited in claim 1, further comprising, if the test determines that the selected other graphics primitive is to be rendered, continuing the fetching of DATA for the selected primitive, if any DATA for the selected primitive has not been prefetched and processing the fetched DATA information for the selected primitive.

13. A method of processing graphics data for a stream of graphics primitives, comprising:
    loading a pipeline with HEAD information for a predetermined number of graphics primitives;
    selecting one of the graphics primitives for processing;
    performing a test based on the HEAD information in the pipeline for the selected one of the graphics primitives to determine whether or not the selected graphics primitive is to be rendered, the test having a latency of a given number of pipeline cycles;
    while performing the test, prefetching DATA information into the pipeline for the selected graphics primitive to avoid empty pipeline cycles during the latency of the test;
    if the test determines that the graphics primitive is to be rendered, continuing the fetching of DATA for the selected primitive, if any DATA for the selected primitive has not been prefetched, and processing the fetched DATA information for the selected primitive; and
    prior to loading the pipeline with HEAD information for a predetermined number of graphics primitives,
        obtaining the predetermined number of indices from an index stream,
        storing each index in a memory storage unit according to a thread flag associated with each memory storage unit that indicates the availability of the memory storage unit for storing an index,
        decoding each index to derive a pointer to the HEAD information for the graphics primitive, and
        making a request for the HEAD information for each primitive to be obtained using the pointer; and
    wherein loading the pipeline with HEAD information for a predetermined number of graphics primitives occurs in response to the to the requests for the HEAD information.

14. A method of processing graphics data as recited in claim 13,
    further comprising, if the test determines that the graphics primitive is not to be rendered,
        altering the thread flag for the storage unit whose primitive is not to be rendered to indicate that the storage unit is available for obtaining an index relating to a new graphics primitive,
        obtaining a new index for processing,
        storing the index in the available memory storage unit,
        decoding the index to derive a pointer to the HEAD information for the new graphics primitive, and making a request for the HEAD information of the new graphics primitive to be obtained using the pointer.

15. A method of processing graphics data for a stream of graphics primitives, comprising:

loading a pipeline with HEAD information for a predetermined number of graphics primitives;

selecting one of the graphics primitives for processing;

performing a test based on the HEAD information in the pipeline for the selected one of the graphics primitives to determine whether or not the selected graphics primitive is to be rendered, the test having a latency of a given number of pipeline cycles;

while performing the test, prefetching DATA information into the pipeline for the selected graphics primitive to avoid empty pipeline cycles during the latency of the test;

if the test determines that the graphics primitive is to be rendered, continuing the fetching of DATA for the selected primitive, if any DATA for the selected primitive has not been prefetched, and processing the fetched DATA information for the selected primitive; and if the test determines that the graphics primitive is not to be rendered, aborting the prefetching of DATA information for the selected graphics primitive;

selecting another graphics primitive for processing;

performing a test based on the HEAD information in the pipeline for the selected other one of the graphics primitives to determine whether or not the selected other graphics primitive is to be rendered, the test having a latency of a given number of pipeline cycles; and while performing the test and to avoid empty pipeline cycles during the latency of the test, prefetching DATA information into the pipeline for the selected other graphics primitive.

16. A method of processing graphics data as recited in claim 15, further comprising, if the test determines that the selected other graphics primitive is to be rendered, continuing the fetching of DATA for the selected primitive, if any DATA for the selected primitive has not been prefetched and processing the fetched DATA information for the selected primitive.

* * * * *